(12) United States Patent
Marold

(10) Patent No.: US 6,365,114 B1
(45) Date of Patent: *Apr. 2, 2002

(54) REACTOR FOR PERFORMING A CATALYTIC REACTION

(75) Inventor: Freimut J. Marold, Weil im Schönbuch (DE)

(73) Assignee: Eisenmann Maschinenbau KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,337

(22) Filed: Mar. 30, 1999

(30) Foreign Application Priority Data

Feb. 10, 1999 (DE) .......................... 199 05 429

(51) Int. Cl.$^7$ ................ B01J 8/02; F28D 7/14
(52) U.S. Cl. ............ 422/200; 422/198; 422/201; 422/205; 422/211; 165/161; 165/175
(58) Field of Search .............. 422/200, 201, 422/205, 216, 218, 220, 221, 211, 173, 177, 178; 165/176, 158, 159, 160, 161, 162, 163, 173, 174, 175

(56) References Cited

U.S. PATENT DOCUMENTS

| | | | | | |
|---|---|---|---|---|---|
| 2,256,882 A | * | 9/1941 | Sebald | ................... | 165/72 |
| 2,438,242 A | * | 3/1948 | Watson | ................... | 422/220 |
| 2,548,295 A | * | 4/1951 | Fahnestock | ............ | 422/220 |
| 2,744,813 A | * | 5/1956 | Paul | ........................ | 422/200 |
| 2,800,307 A | * | 7/1957 | Putney | ................... | 165/108 |
| 2,855,449 A | * | 10/1958 | Owen | .................... | 585/712 |
| 3,007,679 A | * | 11/1961 | Byerley et al. | ........ | 165/176 |
| 3,133,128 A | * | 5/1964 | McDonald | ............. | 585/720 |
| 3,568,764 A | * | 3/1971 | Newman et al. | ...... | 165/134.1 |
| 3,746,083 A | * | 7/1973 | Tiefenbacher | ......... | 165/83 |
| 4,030,539 A | * | 6/1977 | Stute et al. | .......... | 165/134.1 |
| 4,036,293 A | * | 7/1977 | Tank et al. | ........... | 165/134.1 |
| 4,420,462 A | * | 12/1983 | Clyde | ................... | 422/201 |
| 4,586,564 A | * | 5/1986 | Hagemeister | .......... | 165/159 |
| 4,636,365 A | * | 1/1987 | Link et al. | ............ | 422/201 |
| 4,735,260 A | * | 4/1988 | Wohrl et al. | .......... | 165/69 |
| 4,800,955 A | * | 1/1989 | Hagemeister et al. | .. | 165/163 |

* cited by examiner

Primary Examiner—Hien Tran

(57) ABSTRACT

A reactor (1) is described in which a catalytic reaction, associated with a thermal effect, is performed on substances contained in a gas flow, in particular the recovery of sulphur from gases containing hydrogen sulphide. A housing (2) of the reactor (1) comprises a gas inlet (6) and a gas outlet (9). Inside the housing (2) is arranged a bed of catalytically active material, heat being supplied to or withdrawn from said material by means of a temperature regulating device (23) depending upon the nature of the reaction. The temperature regulating device (23) is formed by a plurality of tubes (24) bent in a U-shaped formation. In each case one side of all these U-tubes (24) leads into a first distribution chamber (17) which can be supplied with a heat carrier medium. The other side (24*aa*, 24*ba*) of the U-tubes (24) in each case leads into a second distribution chamber (18) from which the heat carrier medium can be discharged again. The temperature regulating device (23) thus formed is extremely cost-effective to produce and service; it also facilitates a particularly well defined development of a desired temperature distribution within the catalyst bed.

11 Claims, 2 Drawing Sheets

REACTOR FOR PERFORMING A CATALYTIC REACTION

STATEMENT REGARDING FEDERALLY SPONSORED RESEARCH OR DEVELOPMENT

Not applicable.

CROSS-REFERENCES TO RELATED APPLICATIONS

Not applicable.

BACKGROUND OF THE INVENTION

1. Field of the Invention

The invention relates to a reactor for performing a catalytic reaction, associated with a thermal effect, of substances contained in a gas flow comprising
a) a housing having an inlet and an outlet for the gas flow;
b) at least one bed of catalyst material which at least partially fills the interior of the housing;
c) at least one temperature regulating device which is surrounded, at least in parts, by the bed of catalyst material and can be traversed by a heat carrier medium.

2. Discussion of Relevant Art

Reactors of this type are described in DE PS 37 08 957, EP PS 0 260 530 and EP PS 0 431 078. All these publications describe the use of such reactors in the form of the example of recovering sulphur from a gas containing hydrogen sulphide and additionally carrying, or mixed with, oxygen. The catalytic, and in this case exothermal, reaction yields elementary sulphur and water. The corresponding reaction equations are given in EP PS 0 431 078.

The reactor according to the invention is also particularly intended for the recovery of elementary sulphur from gases containing hydrogen sulphide, but is not limited to this application. It can be used in all cases in which substances entrained by the gas flow are to be converted into a desired end product in a catalytic reaction which is associated with a thermal effect and thus takes place exothermally or endothermally. The reactor facilitates optimal spatial temperature profiles, as are required to achieve the highest possible local reaction speeds and/or for setting the desired reaction equilibrium value.

Since, as mentioned, heat is consumed (endothermally) or released (exothermally) in the chemical reactions of interest here, using a temperature regulating device it is necessary to supply or discharge reaction heat and to maintain the temperature of the catalyst bed within a specific range (e.g. temperature window). In the case of exothermal catalytic reactions, the overshooting of a maximum temperature value could, for example, have different disadvantageous results: On the one hand, the materials from which the reactor is composed, as well as the catalyst material, could of course suffer damage. Furthermore, other substances entrained with the gas flow could decompose in an undesirable manner. In general, in addition to the desired reactions (be these endothermal or exothermal), undesired competing reactions could also occur and/or, upon departure from a specific temperature window, the reaction equilibrium could shift undesirably in a specific direction.

In the case of the known reactors of the type referred to in the introduction and described in detail in the above mentioned publications, on account of the exothermal process the temperature regulating device consists of a cooling device in the form of a wound tubular coil. However, such cooling devices are extremely costly to produce, difficult to service and virtually impossible to remove from the reactor housing. As, furthermore, the path of the coolant through coils wound in this way is very long, a substantial change occurs in the temperature of the coolant on its path through the cooling coil, and the development of the desired temperature profile within the catalyst bed either is not very precise or necessitates additional cost-increasing measures.

SUMMARY OF THE INVENTION

The object of the present invention is to develop a reactor of the type referred to in the introduction such that it can be produced cost-effectively and is easy to service.

This object is achieved, in accordance with the invention, in that
d) the temperature regulating device is formed by a plurality of pairs of straight tubes which are connected to one another via a U-shaped section ("U-tubes") and the straight sides of which extend in parallel, one side of each U-tube leading into a first distribution chamber which can be supplied with heat carrier medium and the other side of each U-tube in each case leading into a second distribution chamber from which the heat carrier medium can be discharged.

In accordance with the invention, the temperature regulating device thus no longer consists of a coil, which is difficult to produce, but of U-tubes. Here "U-tube" is to be understood as a structure whose sides consist of two straight tubes connected to one another at one end via a U-shaped section. The production of such U-tubes is extremely simple. Each of these U-tubes is separately traversed by heat carrier medium so that the path along which heat is absorbed or emitted is relatively short and the change in temperature of the heat carrier medium upon its traversal of each individual U-tube is relatively small. The connection of the individual U-tubes to the heat carrier medium cycle is very simple due to the distribution chambers provided in accordance with the invention. If necessary, individual U-tubes of the overall arrangement can be removed, repaired or replaced, thus considerably simplifying the servicing of the reactor according to the invention. By changing the distribution of the tubes, the tube bundle can be adapted to different heat transfers within the catalyst bed without the incurrence of additional costs.

Preferably the sides of each U-tube span a plane extending in parallel to the direction of flow of the gas through the reactor. The two sides of each U-tube, which naturally are at different temperatures, thus occupy positions of the flow path which can and should be at different temperatures. In this way, within the catalyst bed it is possible to obtain isothermal surfaces which are substantially flat and extend at right angles to the direction of flow of the gas through the reactor.

Expediently the U-tubes are distributed between a plurality of planes in each case spaced from one another. In this way the sides of the U-tubes fill the corresponding region within the catalyst bed. The cooling surface density which is obtained can be spatially constant or if necessary can also be a function of the location.

A particularly preferred embodiment is that in which a plurality of U-tubes are arranged in a plane such that an outermost U-tube is provided whose semi-circular bent section has a maximum radius, and in which at least one further U-tube is arranged between the sides and the semi-circular bent section of said outermost U-tube, the semi-circular bent section of said further U-tube having a somewhat smaller radius such that the further U-tube extends in parallel to the outer U-tube in the same plane. In this arrangement the U-tubes arranged in the same plane can, as it were, be internested, which considerably simplifies the connection of the two sides forming part of the various U-tubes to the corresponding distribution chambers. In this way the U-tubes within the same plane need not intersect.

Preferably, the distribution chambers are formed in a head piece which can be detachably secured to a main part of the housing. The removal of this head piece renders the interior of the reactor housing accessible; at the same time the distribution chambers of the assigned assemblies can easily be serviced when required.

In this case it is particularly favourable if the U-tubes are (also) attached to the head piece. With the head piece removed, the U-tubes can then be extracted together with the head piece from the main part of the reactor housing and if necessary serviced.

If the reactor is relatively large, it is advisable to attach a support frame to the head piece, said support frame itself bearing, at a distance from the head piece, at least one grid through which the sides of the U-tubes extend such that they are supported by the grid. In this way the U-tubes no longer are only directly attached to the head piece in freely projecting manner but are relieved of load by the grid or grids so that the fixing points of the U-tubes are not subjected to impermissibly large bending moments.

A metallic web, itself bearing the bed of catalyst material, can be arranged above the support frame. In this way, upon the removal of the U-tubes, the bed of catalyst material can also be removed from the housing and if necessary replaced.

The brunt of the temperature control can be undertaken by the temperature regulating device formed by a plurality of U-tubes. If an extremely accurate and fast responding adjustment of the temperature control is additionally desired, it is possible to employ an embodiment of the invention wherein a plurality of gas lances are arranged in the vicinity of the sides of the U-tubes adjacent to the gas inlet, said gas lances being able to be supplied with gas as additional heat carrier medium or—in the case of stepped reactions—with additional reagents. If, for example in the case of an exothermal reaction, it is necessary for the catalyst bed to be additionally rapidly cooled on the side adjacent to the gas inlet (where experience has shown the maximum temperatures to occur), inert gas not participating in the reaction can be supplied with an appropriate temperature and quantity via the gas lances. This cooling can be very finely dosed and is fast acting.

It is expedient if all the gas lances (also) lead at one end into a third distribution chamber which is formed in the head piece.

In all of the above described cases it proves particularly favourable for the sides of the U-tubes to extend horizontally. With this construction the longer dimension of the reactor housing is aligned horizontally; via the removable head piece the interior of the housing is then accessible from one side. U-tubes and optionally catalyst bed can be moved or pushed out of the reactor housing in the lateral direction. No lifting movement of these heavy parts is required; it is unnecessary to provide a particularly large headroom to obtain access to the inner parts of the reactor.

If necessary, a plurality of temperature regulating devices of the described type can also be arranged in series in a reactor, it also being entirely possible to employ different heat carrier media in the individual temperature regulating devices.

BRIEF DESCRIPTION OF THE DRAWINGS

An exemplary embodiment of the invention will be explained in detail in the following making reference to the drawings in which.

DETAILED DESCRIPTION OF THE PREFERRED EMBODIMENTS

Figure 1:
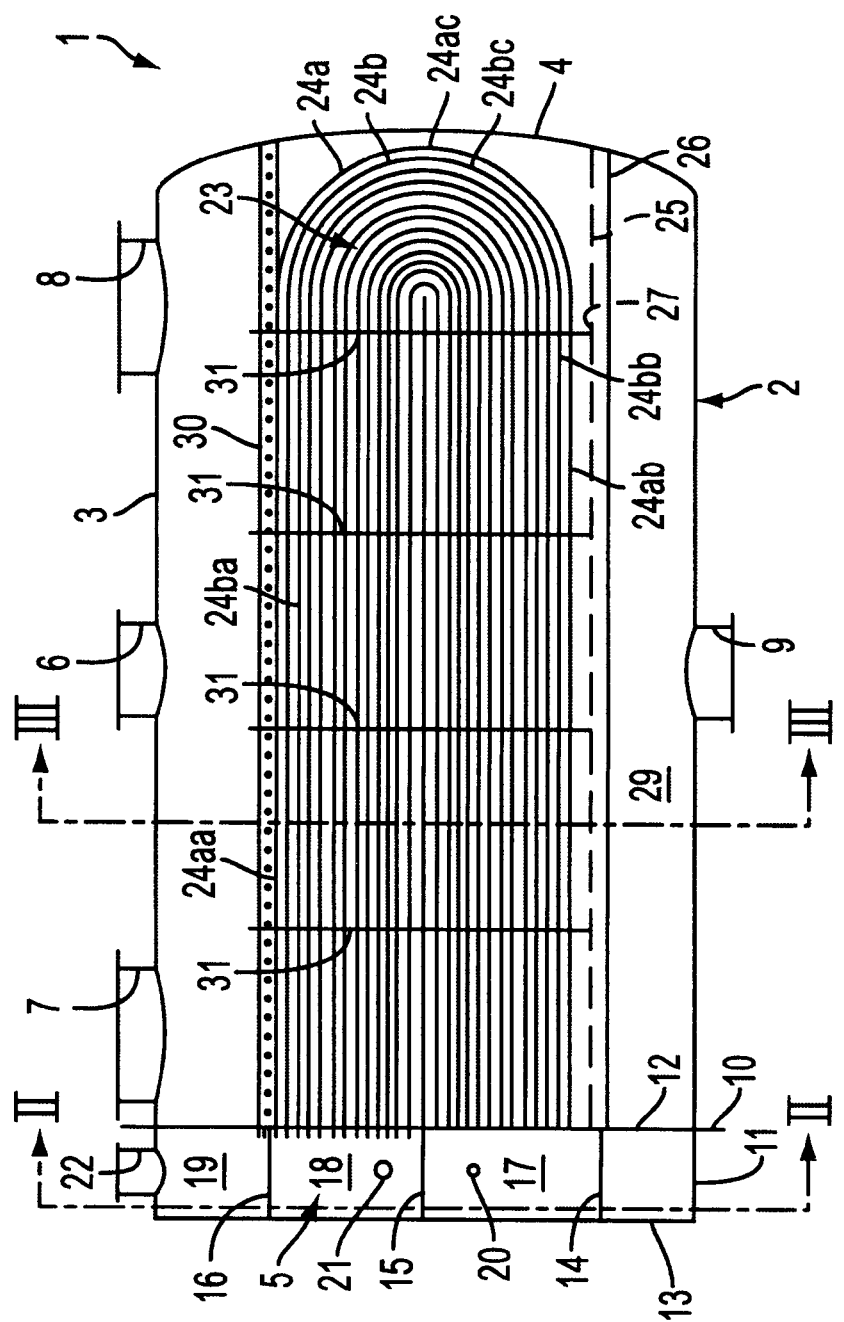
FIG. 1 is a vertical section through a reactor for the recovery of sulphur from gas containing hydrogen sulphide.

The reactor illustrated in the drawing and bearing the overall reference 1 is primarily intended for the recovery of sulphur from gas containing hydrogen sulphide, but can also be used in a virtually unchanged construction for other catalytic, oxidative reactions in gas flows. As the reaction selected by way of an example is exothermal, in the following "cooling" will be referred to instead of temperature regulation.

The reactor 1 comprises a housing 2 having a cylindrical main part 3 whose axis is aligned horizontally. At the end shown on the right-hand side of FIG. 1 the cylindrical housing main part 3 is sealed by a welded-on dished base 4. A head piece 5, which will be described in greater detail later in the description, is attached to the left-hand open end of the housing main part 3.

The housing main part 3 is provided on its upper side with a gas inlet 6 for the gas to be treated and with two manholes 7, 8 intended for servicing purposes. A gas outlet 9 for the treated gas is provided on the underside of the housing main part 3 diametrally opposite the gas inlet 6.

The head piece 5 is detachably secured, by means of a flange 10, to that end of the housing main part 3 shown on the left-hand side of FIG. 1. The head piece 5 comprises a cylindrical sidewall surface 11 which continues, with the same diameter, along the housing main part 3, an inner wall 12 adjacent to the housing main part 3 and a flat outer wall 13. Three horizontally extending partition plates 14, 15, 16 divide the interior of the head piece 5 into three distribution chambers 17, 18 and 19. A coolant supply opening 20 leads into the lower distribution chamber 17; a coolant return opening 21 leads into the central distribution chamber 18 and a secondary gas inlet 22 leads to the uppermost distribution chamber 19.

A cooling device 23 consisting of a plurality of pairs 24 of straight tubes is attached to the inner wall 12 of the head piece 5, which pairs 24 of straight tubes are connected to one another via a U-shaped section and are referred to in brief in the following as "U-tubes". The U-tubes 24 are in each case arranged in the overall bundle such that the rectilinear pairs of sides which they form span a vertical plane.

The manner in which the individual U-tubes 24 are arranged within one and the same vertical plane can be explained in detail making reference to FIG. 1. A first, outermost U-tube 24a has two parallel sides 24aa and 24ab connected to one another by a section 24ac bent in a U-formation. The lower side 24ab leads into the lower region of the lowest distribution chamber 17 in the head piece 5, while the upper side 24aa of the U-tube 24a leads into the upper region of the central distribution chamber 18. A further U-tube 24b extends at a specific distance inside the outermost U-tube 24a and in parallel thereto, the U-shaped bent section 24bc of said further U-tube 24b having a somewhat smaller radius than the U-shaped bent section 24ac of the outer U-tube 24a, such that the two sides 24ba and 24bb of the U-tube 24b extend at a corresponding distance respectively below and above the sides 24aa and 24ab of the outermost U-tube 24a. A plurality of further U-tubes 24, whose U-shaped bent sections each have a progressively smaller radius, are arranged in a corresponding manner inside the U-tube 24b. The space between the outermost sides 24aa and 24ab of the outermost tube 24a thus is filled by a plurality of pairs of sides of further U-tubes 24 spaced from one another by the same distance and extending in parallel with one another. At their end shown on the left in FIG. 1, all the lower sides of these U-tubes 24 lead into the lower distribution chamber 17 while all the upper sides of the U-tubes 24b lead into the upper distribution chamber 18.

As can be seen in particular from FIGS. 2 and 3, further arrangements of U-tubes 24 corresponding to the arrangement illustrated in FIG. 1 are provided above and below the drawing plane of FIG. 1 extending in vertical planes each spaced from one another by a constant distance.

A grate 25 serving as support frame is attached to the inside of the inner wall 12 of the head piece 5 approximately at the level of the lowermost partition plate 14, said grate 25 extending into the interior of the housing main part 3 up to the opposite end, thus up to the dished base 4. Here the support frame 25 can be mounted on lateral bearings 26 attached to the housing main part 3.

A plurality of grids 31, through which the sides of the U-tubes 24 extend, are mounted on the support frame 25 at different distances from the inner wall 12 of the head piece 5 and in parallel thereto. In this way the U-tubes 24 are supported at corresponding distances from the head piece 5.

The grate 25 is covered on its upper side by a web 27 of high-grade steel. The space above the web 27 of high-grade steel is filled with a bed of catalyst material up to a horizontal plane extending above the uppermost side 24aa of the outermost U-tube 24a. The mesh width of the steel web 27 here is sufficiently small to prevent the bed from falling through downwards. The space 29 in the housing 2 which is situated beneath the grate 25 and from which the gas outlet 9 branches off here remains empty.

Figure 2:
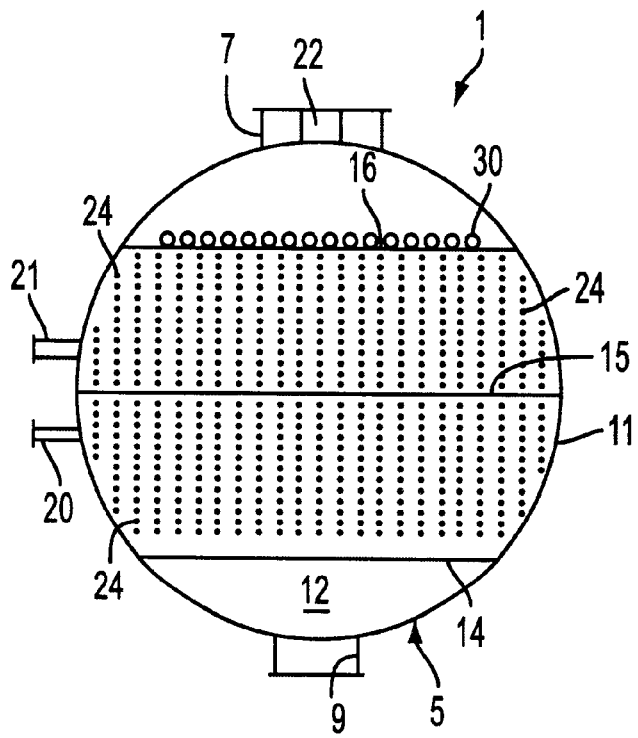
FIG. 2 is a section through the reactor according to FIG. 1 along the line II—II.
Figure 3:
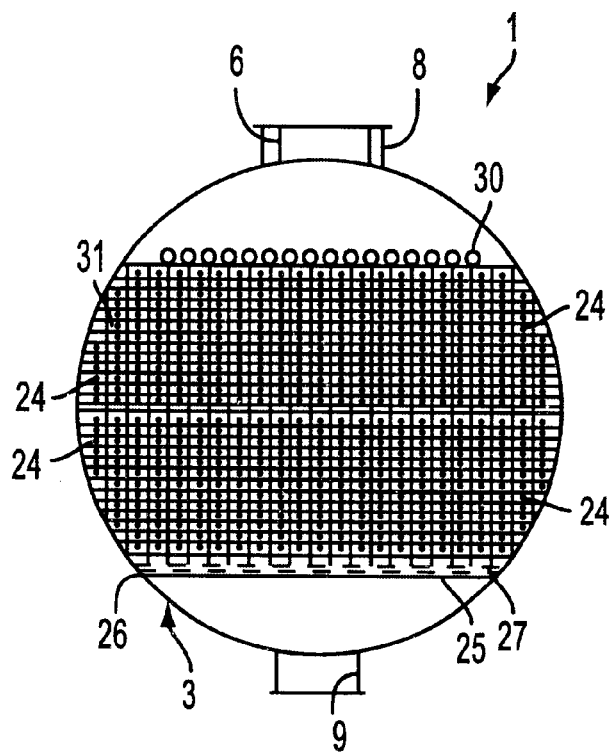
FIG. 3 is a section through the reactor according to FIG. 1 along the line III—III.

A plurality of tubular gas lances 30 extending in a horizontal plane are arranged directly above the catalyst bed (see FIGS. 2 and 3). At their right-hand end in FIG. 1, adjacent to the dished base 4, the gas lances 30 are sealed so as to be gas-tight and bear a plurality of gas outlet openings on their sidewall surface. At their left-hand end in FIG. 1, the gas lances 30 lead into the uppermost distribution chamber 16.

The gas lances 30 can be situated outside the catalyst bed or also inside it. Preferably however, the gas lances 30 are arranged in a packing layer of inert filler material, for example $SiO_2$ or $Al_2O_3$, arranged above the catalyst bed.

The function of the described reactor for the recovery of sulphur from gas containing hydrogen sulphide is as follows:

The gas containing hydrogen sulphide—optionally having been preheated—is introduced from above into the interior of the housing 2 via the gas inlet 6. Here it meets with the catalyst bed, resulting in the immediate initiation of a corresponding exothermal reaction.

Coolant, for example water, is introduced into the distribution chamber 17 of the head piece 5. The water flows through all the U-tubes 24 provided in the cooling device 23, is re-collected in the central distribution chamber 18 and issues from said distribution chamber, appropriately heated, via the coolant outlet opening 21. As a result of the cooling thus obtained, the heating of the gases and the catalyst by the exothermal reaction in the upper region of the catalyst bed is maintained below a specific temperature limit value. The reaction in the gas is limited by a reaction equilibrium defined precisely by this temperature limit value. If the gas now penetrates further downwards in the catalyst bed, it cools further, with the result that the equilibrium is destroyed and the reaction is set in motion again. This process proceeds progressively until the gas has passed through the entire catalyst bed, has entered the lower chamber or space 29 of the housing 2 via the web 27 of high-grade steel, and finally issues from the reactor 1 via the gas outlet 9.

In the housing 2 of the reactor 1 a temperature profile now develops which, commencing from the inlet temperature in the vicinity of the gas inlet 6, firstly rises to a maximum value in the vicinity of the uppermost region of the catalyst bed; the temperature then falls continuously downwards in the reactor, the outlet temperature of the gas being generally somewhat higher than the inlet temperature. Typical values for the recovery of sulphur from gas containing hydrogen sulphide are an inlet temperature of 180° C., a maximum temperature of approximately 380° C. and an outlet temperature of 220° C. The inlet temperature must always exceed the activation temperature of the catalyst. The maximum temperature must not exceed a value at which the materials of the reactor itself, or accompanying substances entrained in the gas, would be likely to undergo thermal damage or at which competing, undesired reactions might occur. In the present case the outlet temperature of the gas must be sufficiently high that the dew point of the sulphur, now in elementary form, is not undershot, so that the sulphur is expelled together with the gas via the gas outlet 9 and can be acquired at a different location. Basically however the acquisition of the elementary sulphur can also take place in the reactor itself. The gas lances 30, already referred to in the foregoing, serve for the fine adjustment of the cooling. For this purpose, secondary gas is introduced via the secondary gas inlet 22 into the uppermost distribution chamber 19 of the head piece 5, said secondary gas being blown into the interior of the reactor housing 2 via the gas lances 30 at an appropriate level. The secondary gas can consist of air, steam or also purified gas branched off from the process. By means of the quantity and temperature of the secondary gas blown in via the gas lances 30, an additional change in the temperature profile developing from the top to the bottom of the reactor 1 can be rapidly achieved with a very fast response, which would not be possible, with this accuracy and speed, by means of the cooling device 23 formed from the U-tubes 24.

The cooling device 23 formed from the plurality of U-tubes 24 can be made easily accessible for servicing. For this purpose, the flange connection 10 between the head piece 5 and the housing main part 3 is released; then the entire cooling device 23 can be removed from the housing main part 3, with the grate 25 sliding on the bearings 26 of the housing 2. The U-tubes 24 and the catalyst bed on the high-grade steel web 27 are then exposed for the 25 required operations.

The above described cooling device 23 consists of U-tubes 24 with only one deflection of the coolant flow. In other cases however, a design comprising a plurality of deflections and a corresponding number of U-shaped bent sections and rectilinear sides is also possible.

The above described reactor 1 comprises only one temperature regulating device or cooling device 23. However, the overall reaction can also take place in stepped manner in a plurality of series connected temperature regulating devices of the described type for which the heat carrier medium does not need to be identical.

What is claimed is:

1. A reactor for performing a catalytic reaction, associated with a thermal effect, of substances contained in a gas flow comprising:

a) a housing having an inlet and an outlet for the gas flow;

b) at least one bed of catalyst material, which at least partially fills the interior of the housing;

c) at least one temperature-regulating device, which is surrounded, at least in part, by the at least one bed of catalyst material and is traversed by a heat medium, wherein the at least one temperature regulating device is formed by a plurality of pairs of straight sides which are connected to one another via a U-shaped section to define a plurality of U-tubes in which each pair of straight sides extend in parallel, one straight side of each pair leads into a first distribution chamber that is supplied with heat carrier medium, and the other straight side of each pair leads into a second distribution chamber from which the heat carrier medium is discharged, wherein the U-tubes are embedded in the at least one bed of catalyst material, wherein the gas flow is directed substantially perpendicularly to the straight sides of the U-tubes, wherein the two sides of each U-tube occupy positions in the flow that are at different temperatures, wherein in the at least one bed of catalyst material, a pre-determined temperature profile is defined originating from an inlet temperature adjacent to the inlet for the gas flow to an outlet temperature adjacent to the outlet for the gas flow, wherein the temperature profile within the at least one bed of catalyst material has isothermal surfaces which are substantially flat and extend at right angles to the gas flow so that the temperature which the gas flow experiences is a function of penetration of the gas flow into the at least one bed of catalyst material.

2. A reactor as claimed in claim 1, wherein the straight sides of each U-tube span a plane extending at right angles to the through-flow direction.

3. A reactor as claimed in claim 1, wherein the U-tubes are distributed between a plurality of planes.

4. A reactor as claimed in claim 1, in which a plurality of the plurality of U-tubes are arranged in one plane such that an outermost U-tube is provided whose U-shaped bent section has a maximum radius, and that at least one further U-tube is arranged between the straight sides and the U-shaped bent section of said outermost U-tube, the U-shaped section of the at least one further U-tube having a smaller radius than the U-shaped bent section of the outermost U-tube such that the further U-tube extends in parallel to the outermost U-tube in the same plane.

5. A reactor as claimed in claim 1, wherein the distribution chambers are formed in a head piece that are detachably secured to a main part of the housing.

6. A reactor as claimed in claim 5, wherein the U-tubes are attached to the head piece.

7. A reactor as claimed in claim 6, wherein a support frame is attached to the head piece, said support frame itself bearing, at a distance from the head piece, at least one grid through which the sides of the U-tubes extend such that they are supported by the grid.

8. A reactor as claimed in claim 7, wherein a metallic web is arranged above the support frame, the web bearing the at least one bed of catalyst material.

9. A reactor as claimed in claim 1, wherein a plurality of gas lances, which are supplied with a gas, are arranged in the vicinity of the straight sides of the U-tubes adjacent to the gas inlet.

10. A reactor as claimed in claim 9, wherein all the gas lances lead at one end into a third distribution chamber formed in a head piece that are detachably secured to a main part of the housing.

11. A reactor as claimed in claim 1, wherein the straight sides of the U-tubes extend horizontally.

* * * * *